(12) United States Patent
Flanagan

(10) Patent No.: US 6,833,077 B2
(45) Date of Patent: Dec. 21, 2004

(54) SEQUENTIAL SWINGING PRECOAT REMOVAL AND RENEWAL SYSTEM, FILTER SO EQUIPPED AND METHOD

(75) Inventor: Peter J. Flanagan, Sandy, UT (US)

(73) Assignee: GL&V Management Hungary Kft., Budapest (HU)

( * ) Notice: Subject to any disclaimer, the term of this patent is extended or adjusted under 35 U.S.C. 154(b) by 0 days.

(21) Appl. No.: 10/126,864

(22) Filed: Apr. 19, 2002

(65) Prior Publication Data

US 2002/0166822 A1 Nov. 14, 2002

Related U.S. Application Data

(60) Provisional application No. 60/285,858, filed on Apr. 23, 2001, and provisional application No. 60/302,724, filed on Jul. 3, 2001.

(51) Int. Cl.⁷ .............................................. B01D 37/00
(52) U.S. Cl. .................... 210/772; 210/777; 210/780; 210/193; 210/331; 210/332; 210/391; 210/392; 210/406; 210/408; 210/409
(58) Field of Search ................................. 210/772, 777, 210/780, 784, 106, 107, 193, 331, 332, 391, 392, 396, 406, 407, 408, 409

(56) References Cited

U.S. PATENT DOCUMENTS

| | | | |
|---|---|---|---|
| 1,804,934 A | | 5/1931 | Hoyt |
| 2,839,194 A | * | 6/1958 | Lopker et al. ............... 210/772 |
| 3,075,646 A | * | 1/1963 | Giesse ......................... 210/391 |
| 3,521,751 A | | 7/1970 | Holthuis |
| 4,136,028 A | | 1/1979 | Toivonen |
| 4,639,315 A | | 1/1987 | Fuchs et al. |
| 4,943,372 A | * | 7/1990 | Kohonen .................... 210/324 |
| 4,975,189 A | * | 12/1990 | Liszka ........................ 210/327 |
| 4,995,991 A | * | 2/1991 | Ljokkoi et al. ............. 210/797 |
| 5,149,448 A | * | 9/1992 | Mattelmaki ................. 210/784 |
| 5,407,587 A | * | 4/1995 | Westerberg ................. 210/784 |
| 5,470,472 A | * | 11/1995 | Baird et al. ................. 210/391 |
| 5,759,397 A | | 6/1998 | Larsson et al. |
| 5,851,392 A | * | 12/1998 | Brady, Jr. ................... 210/396 |
| 5,897,788 A | | 4/1999 | Ketolainen et al. |
| 5,900,158 A | | 5/1999 | Ruokolainen et al. |
| 5,968,372 A | | 10/1999 | Martensson et al. |
| 6,063,294 A | | 5/2000 | Martensson et al. |
| 6,596,166 B1 | * | 7/2003 | Danielsson et al. ........ 210/324 |
| 2002/0166821 A1 | * | 11/2002 | Flanagan ..................... 210/784 |
| 2002/0166822 A1 | * | 11/2002 | Flanagan ..................... 210/784 |

FOREIGN PATENT DOCUMENTS

| | | |
|---|---|---|
| DE | 1 148 950 | 5/1963 |
| DE | 30 47 539 A1 | 7/1982 |
| EP | 0 454 392 B1 | 7/1996 |
| EP | 0 642 375 B1 | 10/1996 |
| WO | WO 93/23140 | 11/1993 |
| WO | WO 94/23821 | 10/1994 |

OTHER PUBLICATIONS

International Search Report, International Application No. PCT/US02/12539, dated Dec. 12, 2002 (8 pages).

* cited by examiner

*Primary Examiner*—Robert James Popovics
(74) *Attorney, Agent, or Firm*—TraskBritt

(57) ABSTRACT

A precoat renewal system for a filter, such as a disc filter. The renewal system includes a plurality of nozzles coupled to spray piping and valving with each nozzle being positioned for spraying an area of one side of a disc. The nozzles and at least a portion of the spray piping is movable such that the nozzles may be displaced relative to the discs. The nozzles and piping are arranged in groups or zones with each zone covering a specified percentage of the discs in the filter and each zone representing about 40% or less of the surface area of the filter media of the discs in the filter. The system may be configured such that high pressure fluid may be supplied to that particular zone for removal of a precoat layer on the disc while other zones may be concurrently washed with a lower pressure fluid.

11 Claims, 6 Drawing Sheets

SEQUENTIAL SWINGING PRECOAT REMOVAL AND RENEWAL SYSTEM, FILTER SO EQUIPPED AND METHOD

CROSS-REFERENCE TO RELATED APPLICATIONS

This application claims the benefit of U.S. provisional patent application, Ser. No. 60/285,858 filed Apr. 23, 2001, and U.S. provisional patent application, Ser. No. 60/302,724 filed Jul. 3, 2001.

BACKGROUND OF THE INVENTION

1. Field of the Invention

The present invention relates generally to precoat filters such as disc filters having a layer of precoat thereon and, more particularly, to the washing and renewal of a precoat layer on such filters.

2. State of the Art

Filtration equipment such as disc or drum filters are known in the art for their use in separating solid particles from a liquid in which they are suspended. Such filters typically pass the particle-containing liquid through a selected filter media which allows the passage of liquid therethrough while retaining the particles on a surface of the filter media for subsequent collection. The liquid passing through the filter media is typically referred to as filtrate while the particles on the surface of the filter media are typically referred to as cake.

The filter media used in such a process may be formed from a variety of different materials but is often of a cloth- or fabric-type material, including, for example, wire mesh, formed of natural or synthetic materials. Additionally, filter media may include a built-up layer of cake on the filtration surface of a drum, disc, or other filter element. This layer of cake is referred to as a precoat. It is noted that, depending on the type of material being processed, the precoat layer may be formed from a material that is the same as or similar to the material being filtered. For example, if lime mud is being filtered and removed from a liquid, lime mud may also be used as the precoat. However, the precoat does not have to be formed of the same material as that which is being filtered.

The precoat layer is typically formed on top of a filter cloth, with the two elements working in conjunction to separate filtrate from the process cake. The precoat layer is a permeable layer which allows filtrate to pass through while capturing additional particles on a surface of the precoat layer. The filtered particles are typically removed, often by a scraping device, while the precoat layer remains on the filter media for continued filtering.

After a precoat layer has been in use for an extended amount of time, the precoat layer becomes less permeable and thus reduces the efficiency of the filtering operation by allowing less filtrate to pass therethrough. When the precoat layer is in such a condition, it becomes desirable to remove and regenerate the precoat layer by removing the existing precoat layer of material in its entirety and forming a new precoat layer in its place.

One type of apparatus used in removing and regenerating precoat layers on a filter is disclosed in U.S. Pat. No. 5,759,397 to Larsson et al. (issued Jun. 2, 1998), the disclosure of which is hereby incorporated herein by reference. FIGS. 1 and 2 hereof are representative of the apparatus disclosed in the Larsson patent. FIGS. 1 and 2 show a disc filter 10 including a plurality of hollow discs 12 having sidewalls 14 of a filter material 16. The hollow discs 12 are coupled to a hollow axle 18 and are in fluid communication therewith via holes 20 formed along the hollow axle 18.

The hollow discs 12 are positioned within a container 22, such as a tank, which includes an inlet 24 for introducing a slurry 26 (i.e., a particle-containing liquid) into the container 22. A vacuum 28 draws the filtrate through filter material 16 with particles from the drawn liquid accumulating on the surface of the filter material 16 to form a cake.

As shown in FIG. 2, the container 22 is filled slightly less than halfway with the slurry. The discs 12 are configured to rotate counterclockwise through the slurry 26. In operation, a portion of the discs 12 enters into the slurry 26 to draw filtrate from the slurry 26 and then emerge with a cake formed of accumulated particles. A scraper 30 is used to remove the accumulated cake from the discs 12 while leaving a specified thickness of precoat material. The cake removed from the discs 12 is collected in a chute or bin 32 and transferred from the filter 10 for further processing or disposal, as the case may be.

When it is desired to remove and regenerate the precoat, an oscillating spray pipe 34 having a spray nozzle 36 coupled thereto moves between the periphery and center of the disc 12 removing the precoat layer by spraying the precoat layer with a pressurized fluid. The Larsson patent describes such removal and regeneration as taking place in two steps with half of the discs being stripped of the their precoat layer followed by replacement of such layer, while the precoat layers of the other half of the discs are not sprayed.

It is believed that such an arrangement may expose too much surface area of the fabric filter media by removal of the precoat layer therefrom, thus resulting in the loss of vacuum crucial to operation of the filter. If the vacuum is broken, it is likely that the precoat layers remaining on the additional discs (i.e., those not having the precoat layers renewed) will drop their precoat layers, causing a serious and expensive interruption in the operation of the filter.

In addition to potential loss of vacuum, removal of the precoat layer using high pressure fluid may cause damage to the underlying filter media, particularly over time. Thus, while it may be desirable to remove and regenerate precoat at fairly frequent intervals, such frequency may necessitate a consequent undesirable frequency of downtime of the filter system for replacement of the filter media.

U.S. Pat. No. 5,897,788 to Ketolainen et al. (issued Apr. 27, 1999) discloses the use of a spray nozzle oriented at an acute angle to the surface of a filter drum of a drum-type filter to remove an outer, more porous and softer portion of the precoat layer on a substantially continuous basis between removals of the precoat layer in its entirety down to the filter wire.

Other filters have likewise used swinging spray showers to assist in washing of process materials on precoat layers such as that disclosed in U.S. Pat. No. 6,063,294 to Martensson et al. (issued May 16, 2000), the disclosure of which is hereby incorporated herein by reference. The Martensson patent discloses a spray assembly having multiple nozzles in each spray pipe and wherein the speed at which the spray pipe traverses the face of a disc is varied according to its radial position relative to the disc. An additional feature disclosed in the Martensson patent is an independent washing shower which is optionally used to soak process material on the exterior of the precoat and thus increase the efficiency of cake removal using the scraper. In essence, the washing shower includes a spray pipe and one or more nozzles directed at the filtering surface of a given filter (i.e., the filtering surface of a drum or a disc). Using a disc as an example, and considering the disc to be divided into a plurality of segments, the wash assembly sprays water on the precoat surface of a given disc segment subsequent to the disc segment being rotated through the pool of slurry. The wash water flows through the filter media, including the precoat, forcing any filtrate potentially remaining in the cake and precoat layers to be drawn through the filter by the vacuum. Without the washing apparatus, some filtrate liquid might potentially be discharged with the cake layer, thus causing some inefficiency with the operation.

While the washing shower provides some increased efficiency in production of filtrate, such shower assemblies require piping and valving in addition to that required for the precoat removal system. Additionally, the inclusion of a washing shower may add constraints to the overall design of the filter as the shower heads take up additional space and must be designed so as to not interfere with any moving components of the filter.

Accordingly, it would be advantageous to provide a precoat removal apparatus and system which allows for maximum efficiency in replacing the precoat layer on filter media of filter discs of a disc-type filter without losing the vacuum (or pressure differential) formed across the filter media. Additionally, it would be advantageous to provide a precoat removal apparatus and system which also incorporates a precoat renewal feature in a disc-type filter to minimize the necessity to remove and regenerate the precoat layer and to potentially reduce the frequency of repair of the filter media.

BRIEF SUMMARY OF THE INVENTION

The present invention comprises a precoat renewal system for a filter such as a disc filter. The precoat renewal system includes a plurality of nozzles coupled to spray piping and valving with each nozzle being positioned for spraying an area of one side of a disc. The nozzles and at least a portion of the spray piping may be movable such that the nozzles may be displaced relative to the discs. The nozzles and piping may be arranged in groups or zones with each zone covering a specified percentage of the discs in the filter. Each zone may represent about 40% or less of the total surface area of the filter media of the plurality of filter discs in the filter. It may be preferred that each zone be configured to effect fluid impingement on between about 15 and 25% of the total surface area of the filter media of the plurality of filter discs.

Each zone may be configured such that high pressure fluid may be supplied to that particular zone for removal of a precoat layer on the disc. The precoat renewal system may be configured so that other zones may be concurrently washed with a lower pressure fluid. The zones may be sequentially or otherwise segmentally provided with high pressure fluid until the precoat layers of each respective zone have been removed and renewed.

A disc-type filter system incorporating the precoat renewal system as well as a method of treating a precoat layer on a disc-type filter including a plurality of filter discs are also encompassed by the present invention.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
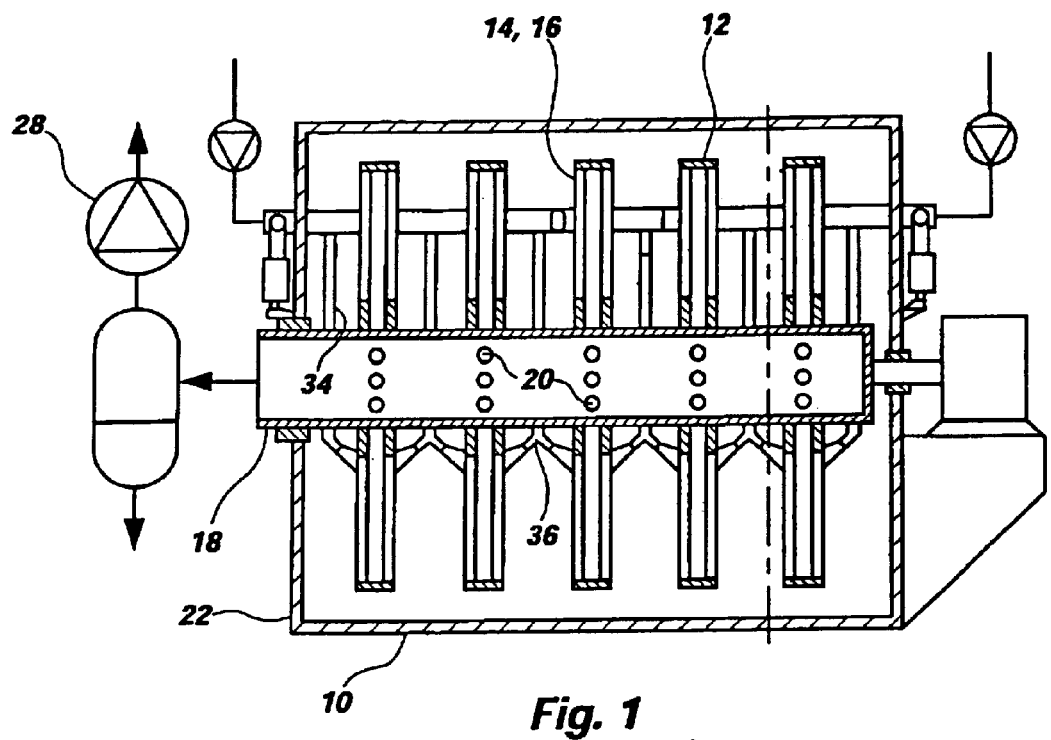
FIG. 1 is a cross-sectional side view of a prior art disc filter.
Figure 2:
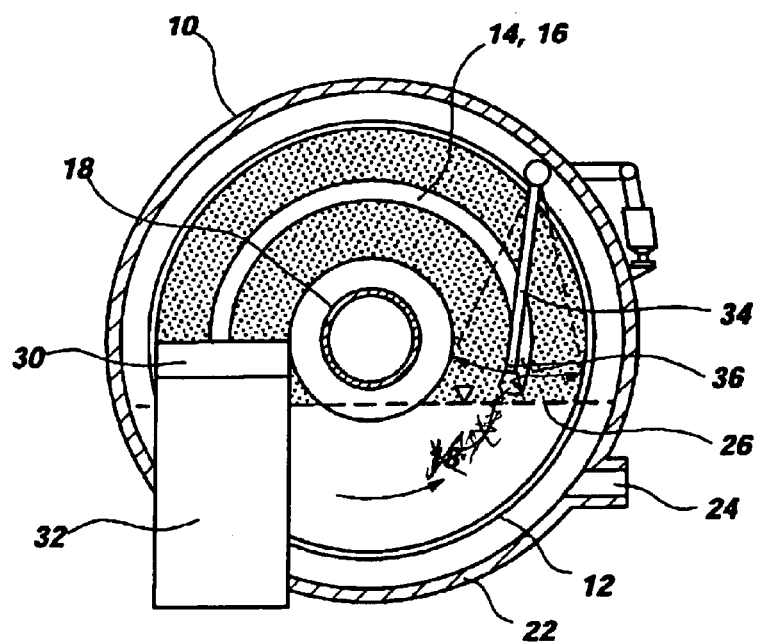
FIG. 2 is a cross-sectional end view of the prior art disc filter shown in FIG. 1.
Figure 3:
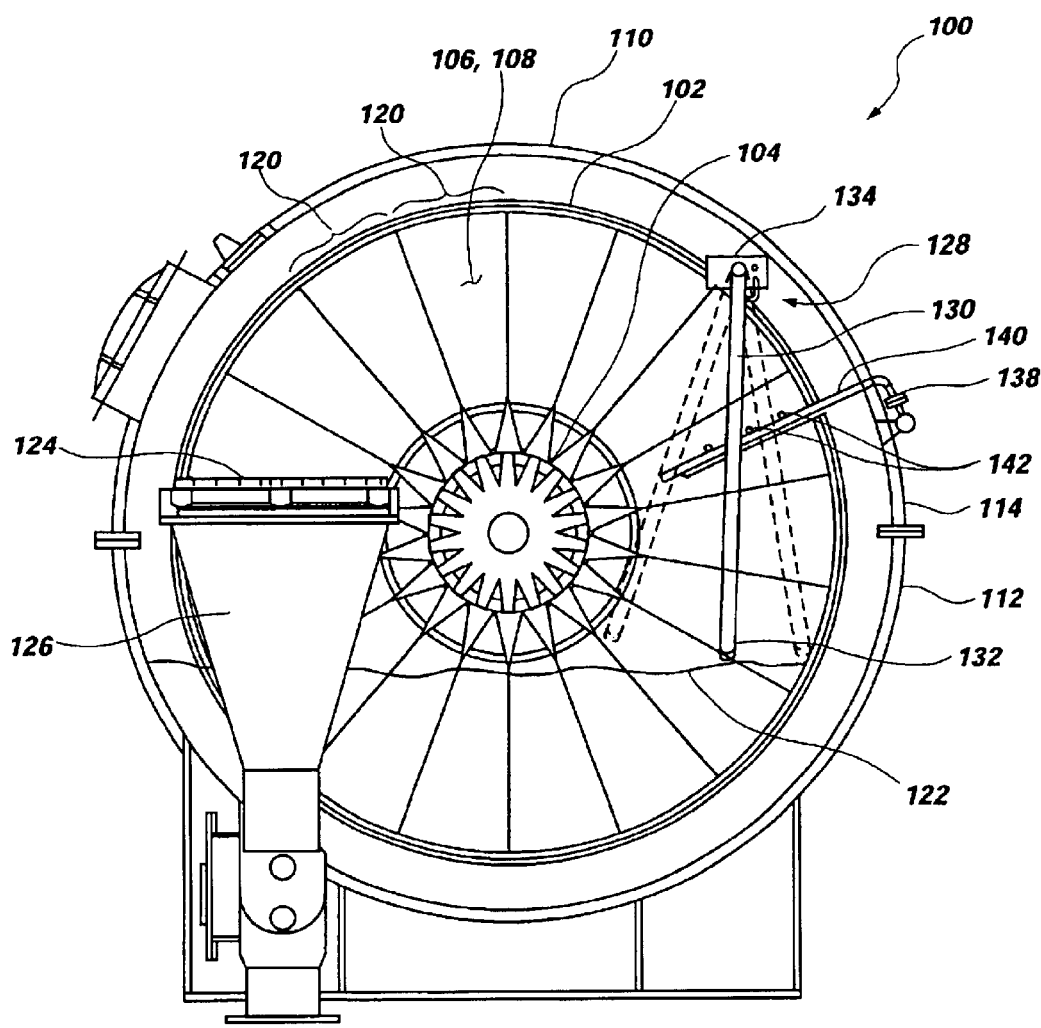
FIG. 3 is a cross-sectional end view of a filter and precoat renewal apparatus according to one embodiment of the invention.
Figure 4:
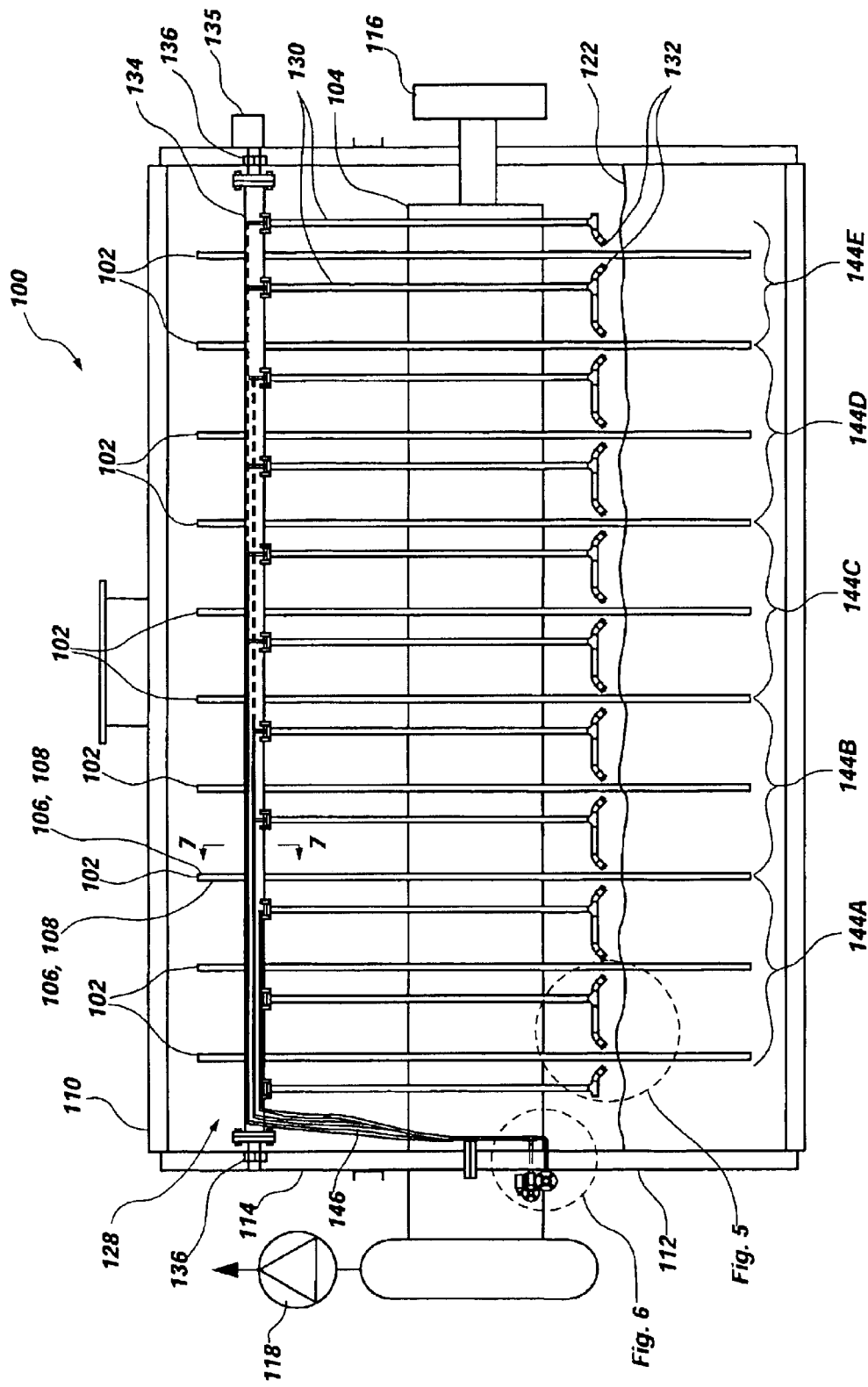
FIG. 4 is a cross-sectional end view of the filter and precoat renewal apparatus shown in FIG. 1.

Referring to FIGS. 3 and 4, a disc filter 100 is shown which is generally constructed in a manner similar to the filter shown in FIGS. 1 and 2. The disc filter 100 includes a plurality of discs 102 coupled to a hollow shaft 104 allowing for fluid communication therebetween. The discs 102 are formed of sidewalls 106 having a filter media 108 thereon which may include a filter cloth made, for example, of a wire mesh as well as a layer of precoat material thereover. The discs 102 are housed in a vessel or container 110, which may include a tank portion 112 and a hood or lid portion 114. The vessel 110 may or may not be pressurized depending on specific applications and processing requirements. A drive system 116 is coupled to one end of the hollow shaft 104 to rotate the discs 102 and a vacuum source 118 is coupled to the other end of the hollow shaft 104. The vacuum source 118 may not be required if the vessel 110 enclosing the discs 102 is pressurized at a sufficient level.

As seen in FIG. 3, with the discs 102 rotating counterclockwise, a plurality of sections 120 formed on the disc 102 each individually rotate downward into a slurry 122 and upward out of the slurry 122. As the sections 120 rotate into the slurry 122, a pressure differential between the interior of the vessel 110 and the interior of the hollow shaft 104 (such as may be produced by the vacuum source 118) causes the slurry 122 to flow through the sidewalls 106 of the disc 102 with filtrate passing through the filter media 108 and particulates being formed as a cake on the surface of the filter media 108 (i.e., on the surface of the precoat layer).

A scraper assembly 124 is positioned adjacent the falling side of each disc 102 (i.e., adjacent the portion of the disc 102 rotating down toward the slurry 122) along with a chute or bin 126 for collection of the cake scraped from the filter media 108. The collection bins 126 may be in communication with a conveyor system, such as a screw conveyor or the like (not shown), for transportation of the discharged cake as is known in the art.

Figure 5:
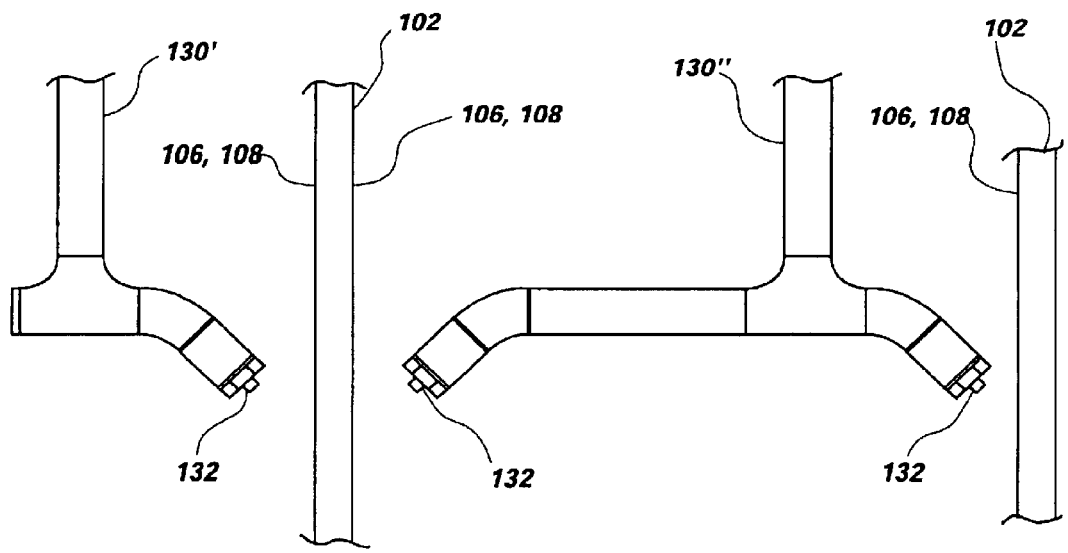
FIG. 5 is an enlarged detail of a portion of the precoat renewal apparatus as indicated in FIG. 4.
Figure 6:
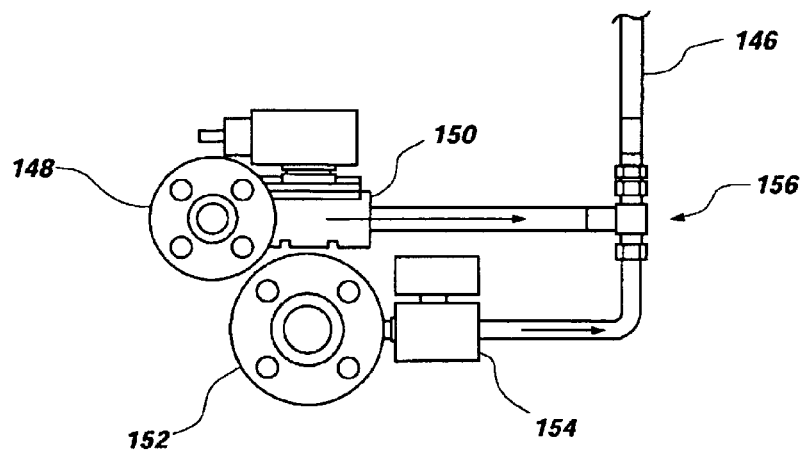
FIG. 6 is an enlarged detail of a portion of the precoat renewal apparatus as indicated in FIG. 4.

The disc filter 100 further includes a regenerative shower system 128 which is used to remove and regenerate or, alternatively, renew the precoat layers of the discs 102 in a sequential or other segmented fashion. The regenerative shower system 128 includes a plurality of spray pipes 130, each extending along at least one side of a disc 102 and having a nozzle 132 at the distal end thereof. Each nozzle 132 is positioned and configured to spray a portion of an adjacent sidewall 106 of a precoat 102 and the filter media 108 associated therewith and either remove a portion of the thickness of the layer of precoat material from filter media 108 or, in the alternative, strip the precoat material in its entirety from its associated filter media 108 on sidewall 106 and clean the filter media 108. It is noted that most of the spray pipes 130 are configured to spray the sidewalls 106 of two independent but adjacent discs 102 while the spray pipes 130 on the ends of the disc filter 100 are configured to only spray one sidewall 106 of one disc 102 each. This arrangement may be seen in FIG. 5, where an end spray pipe 130' includes a single nozzle 132 while an interior spray pipe 130" includes two nozzles 132, each oriented toward the sidewall 106 of a separate disc 102.

Referring again to FIGS. 3 and 4, the spray pipes 130 are coupled to a support 134 which may be formed from a structural member such as an I-beam and which is, in turn, coupled to bearings 136 at either end of the vessel 110. The bearings 136 allow the support 134 and associated spray pipes 130 to oscillate through a predetermined arc which extends from the outer edge of the discs 102 to the inner edge of the discs 102, as is best seen in FIG. 3. The oscillating pattern of the spray pipes 130 allows renewal or regeneration of the precoat layers to take place at one small section of filter media at a time. The support 134 and spray pipes 130 are motivated through the oscillating pattern by a drive 135 such as a servo motor coupled to the support 134. It is noted that a displacement mechanism of another configuration may also be used to move the nozzles 132 relative to the discs 102. For example, the nozzles 132 and spray pipes 130 may be coupled to a linear or curvilinear track positioned between the discs 102. Such a mechanism would allow displacement of the nozzles 132 and might be desirable if overhead space was limited within the vessel 110. In such a case, it might be desirable to form at least a portion of the spray pipe 130 from flexible material. In addition, it is contemplated that fixed spray pipes, each with a plurality of spray nozzles disposed along its length and appropriately sized to distribute liquid flow, may be placed between each of the discs 102 and longitudinally outboard of the end discs 102 to renew and regenerate the precoat layers thereon, as further described below with respect to FIG. 9.

While not required, an auxiliary wash shower assembly 138 for adding liquid to process material on the precoat layer may be installed on the disc filter 100 and may include one or more spray headers 140 having a plurality of spray nozzles 142 installed therein. Such a wash shower, if desirable for given process parameters and if design constraints allow, may enhance the recovery of filtrate as discussed above.

The regenerative shower assembly 128 is arranged in sections or zones 144A–144E with each zone representing a percentage of total disc filter media surface area within a predetermined range. For example, the disc filter 100 shown includes a total of ten (10) discs 102, or twenty (20) sidewalls 106. Each sidewall 106 has an associated spray pipe 130 and nozzle 132. However, if each of the spray pipes 130 are operated such that the precoat layers were being simultaneously stripped off of each sidewall 106, it is likely that the vacuum formed within hollow shaft 104 (or the pressure differential formed between the vessel 110 and hollow shaft 104) might be lost, resulting in the loss of all precoat layers and cake layers formed on the sidewalls 106 of the discs 102. Thus, only a portion of the discs 102 may have their associated precoat layers removed and regenerated on filter media 108 at a given time.

In the disc filter 100 shown in FIG. 4, each zone 144A–144E represents a zone in which removal and regeneration of the precoat layer may be performed at a given time. For example, the precoat layers in zone 144A, which includes three (3) different spray pipes 130 and five (5) different disc sidewalls 106, might be removed and generated at a given time while the precoat layers in each of the other zones 144B–144E were not being renewed. Thus, in operation, zone 144A might first be subjected to precoat removal and regeneration, followed sequentially by zones 144B, 144C, 144D and finally 144E. It is noted, however, that by monitoring the production of the disc filter 100, it may be possible to select a particular zone for precoat removal and regeneration without the need to sequentially remove and regenerate the precoat layer in the remaining zones.

When the regenerative shower system 128 is not being used to remove and regenerate the precoat layers in a given zone, it may be used to renew the precoat layers in every zone 144A–144E. Alternatively, when a given zone, for example 144A, has the precoat layers being removed and regenerated, the remaining zones 144B–144E may be renewed using the regenerative shower system 128. This is accomplished by selectively communicating the spray pipes 130 of each zone 144A–144E to separate supply sources for removal and regeneration of precoat layers (with associated cleaning of the underlying filter media 108) and for renewal of the precoat layers. For example, referring to FIGS. 4 and 6–8, separate feed piping 146A–146E extends to the spray pipes 130 of each zone 144A–144E. Each zone is thus connected to a high pressure source 148 with a valve 150 being coupled therebetween. The high pressure source may include, for example, water at a pressure of approximately 300 to 1000 psi for removal of precoat layers of a given zone 144A–144E and cleaning of the filter media 108 therein. A second source 152 is also coupled to the feed piping 146 which may be, for example, plant water at a pressure of approximately 60 psi. A second valve 154 may be coupled between the second source 152 and the feed piping 146 if so desired. The piping extending downstream from valves 150 and 154 meets at a common connection, for example, a "T" connection 156 as shown, communicating with feed piping 146. The valves 150 and 154 may comprise, for example, solenoid-actuated full port ball valves.

Figure 7:
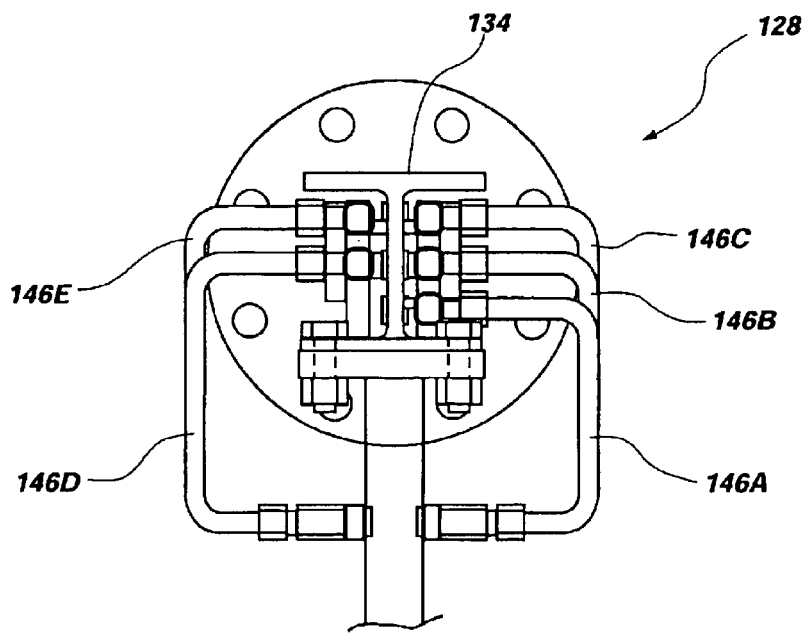
FIG. 7 is an enlarged cross-sectional detail of the precoat renewal apparatus at section line 7—7 as indicated in FIG. 4.
Figure 8:
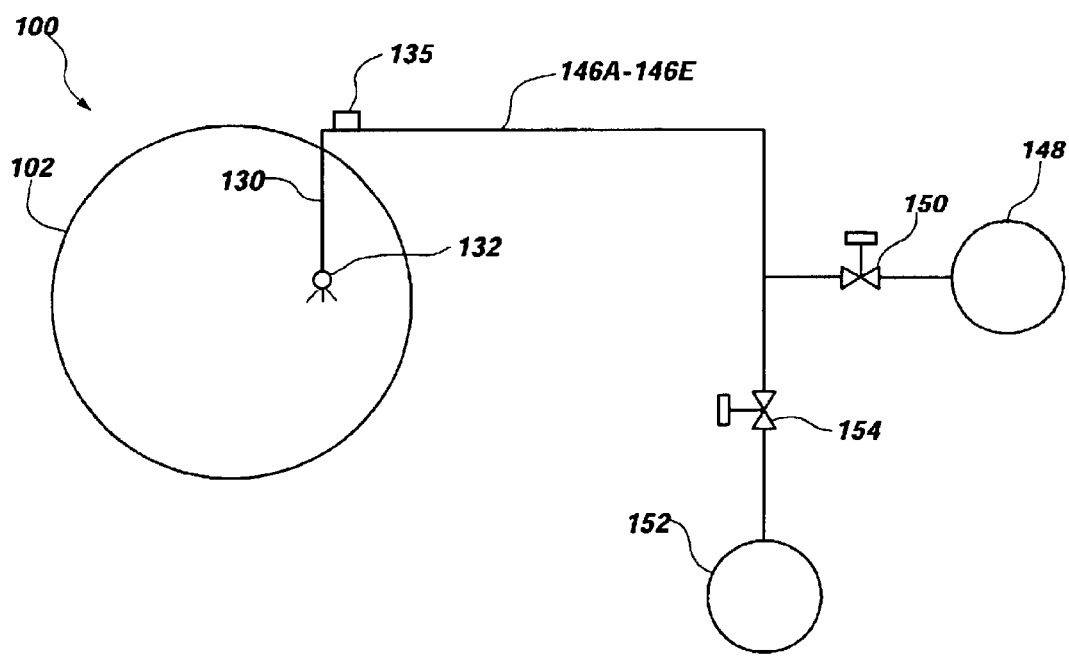
FIG. 8 is a schematic showing valving and piping of the precoat renewal apparatus according to one embodiment of the invention.

Thus, in operation, the second valve 154 may open, allowing the second source 152 to supply a particular zone with relatively low pressure water for the renewal of precoat layers thereof by removing only a partial thickness of the outer portion or layer of the precoat, such outer layer being the first to clog with particulates and compromise filtration efficiency. By removing only an outer portion of the precoat, the precoat is renewed and efficiency restored without stripping the precoat layer completely. However, when it is desired to remove and regenerate the precoat layers in a particular zone, either by operator decision or by virtue of control logic through sensing of various filtering parameters, the second valve 154 (if so equipped) will shut off the second supply 152 from the piping and the first valve 150 will open, allowing the high pressure source 148 to supply the feed piping 146 with relatively higher pressure water to remove the precoat layers of the associated zone. As can be seen in FIG. 7, different sections of feed piping 146A–146E are separately valved and may thus be utilized to selectively direct fluid to each zone 144A–144E respectively. It is, of course, also contemplated that disc filter 100 may operate in a mode wherein neither renewal nor removal and regeneration of a precoat layer is being effected on any of the discs 102, the frequency of need for renewal of the precoat layer as well as for the removal and regeneration thereof being dependent on a number of operational parameters of disc filter 100 which may vary according to the filtration operation for which disc filter 100 is employed.

Referring back to FIGS. 3 and 4, and particularly FIG. 4, the spray zones 144A–144E and their arrangement are designed to allow for efficient removal and regeneration of precoat layers without losing the vacuum (or other pressure differential) required for filter operation. For example, as noted above, the first zone 144A represents five (5) sidewalls 106 of the filtering surface area. This is equivalent to about 25% of the total filter media surface area for the depicted disc filter 100. For the configuration shown, no zone represents more than about 25% of the total filter media surface area or less than about 15% (zone 144E) of the filter media surface area. Most of the zones shown (144B–144D) represent about 20% of the total filter media surface area. While the zones of a given filter may be designed to work with greater than about 25% of the total filter media surface area, it is believed that a zone representing about 50% of the total filter media surface area would allow the vacuum (or pressure differential) to be lost. Thus, a zone representing about 35 to 40% of total filter media surface area may represent the upper limit of efficiency for complete removal of precoat down to and including washing of the filter media 108 without an endangering loss of vacuum or pressure differential.

Figure 9:
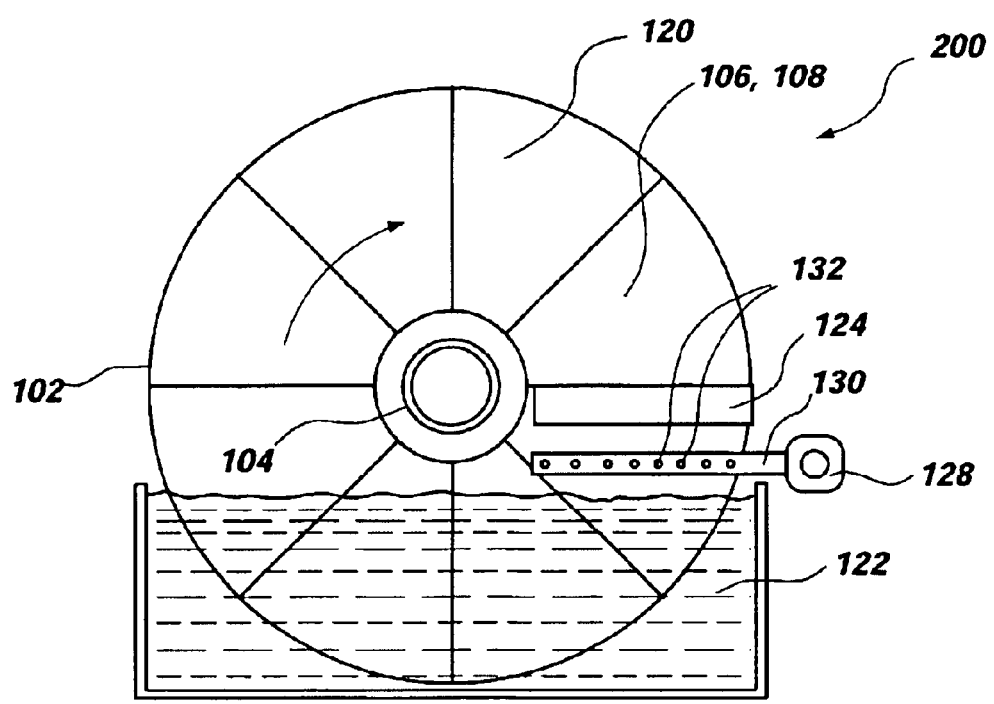
FIG. 9 is a cross-sectional end view of a filter according to a further embodiment of the invention.

FIG. 9 of the drawings illustrates a further exemplary embodiment of the disc filter 200 of the present invention wherein previously described components and features now depicted in FIG. 9 are identified by reference numerals having the same numbers as with respect to disc filter 100. The disc filter 200 includes a plurality of discs 102 coupled to a hollow shaft 104 allowing for fluid communication therebetween. The discs 102 are formed of sidewalls 106 having a filter media 108 thereon which may include a filter cloth made, for example, of a wire mesh as well as a layer of precoat material thereover. The discs 102 are housed in a vessel or container, which may include a tank portion and a hood or lid portion. The vessel may or may not be pressurized depending on specific applications and processing requirements. A drive system is coupled to one end of the hollow shaft 104 to rotate the discs 102 and a vacuum source is coupled to the other end of the hollow shaft 104. The vacuum source may not be required if the vessel enclosing the discs 102 is pressurized at a sufficient level.

With the discs 102 rotating clockwise, a plurality of sections 120 formed on the disc 102 each individually rotate downward into a slurry 122 and upward out of the slurry 122. As the sections 120 rotate into the slurry 122, a pressure differential between the interior of the vessel and the interior of the hollow shaft 104 (such as may be produced by the vacuum source) causes the slurry 122 to flow through the sidewalls 106 of the disc 102 with filtrate passing through the filter media 108 and particulates being formed as a cake on the surface of the filter media 108 (i.e., on the surface of the precoat layer).

A scraper assembly 124 is positioned adjacent the falling side of each disc 102 (i.e., adjacent the portion of the disc 102 rotating down toward the slurry 122) along with a chute or bin (not shown in FIG. 9) for collection of the cake scraped from the filter media 108. The collection bins may be in communication with a conveyor system, such as a screw conveyor or the like (not shown) for transportation of the discharged cake as is known in the art. A regenerative shower assembly 128, which may comprise fixed or movable spray pipes 130 bearing spray nozzles 132, is placed below scraper assembly 124 and above the surface of slurry 122. As previously described with respect to disc filter 100, the regenerative shower system 128 may be used to periodically renew the precoat layers on the filter media 108 of filter discs 102 by removing outer portions of the precoat layers using a relatively lower pressure fluid, or remove the precoat layers in their entirety and clean the underlying filter media 106 using a relatively higher pressure fluid.

It will be appreciated that such an arrangement, with regenerative shower assembly 128 on the falling side of each disc 102, will expose a relatively small portion of the surface area of filter media 108 of each disc 102 during removal of the precoat layer for regeneration. Thus, it may not be necessary to divide the discs 102 into a plurality of zones for removal of the precoat layer, as the total filter media surface area exposed at any one time is insufficient to cause a detrimental loss of pressure differential between the interiors and exteriors of filter discs 102, since a maximum of only about 30° or arc out of 360° on each filter disc 102 may be exposed before being resubmerged in slurry 122. In contrast, if regenerative shower system 128 is placed on a rising side of a filter disc 102 (as filter media 108 moves upwardly out of slurry 122), as much as about 40% of a given filter disc's total filter media surface area may be exposed during precoat layer removal, causing an unacceptable loss of pressure differential.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A precoat removal, regeneration and renewal system for a precoat filter having a plurality of filter discs, each filter disc having a first side and a second side, both sides bearing filter media, the system comprising:

a plurality of spray nozzles, each first side and each second side of each filter disc of the plurality having at least one spray nozzle positioned to spray a fluid on a surface thereof at a location on a rising side of each filter disc as the pluraliy of filter discs is rotated about a defined axis;

spray piping coupled to the spray nozzles of the plurality; and at least one valve coupled with feed piping in communication with the spray piping wherein the at least one valve and the feed piping are configured, in combination, to permit selection between a first flow of a relatively lower pressure fluid and a second flow of a relatively higher pressure fluid to be conveyed through the feed piping through the spray piping to the plurality of spray nozzles.

2. The precoat removal, regeneration and renewal system of claim 1, wherein the plurality of spray nozzles is grouped in a plurality of zones.

3. The precoat removal, regeneration and renewal system of claim 2, wherein each of the plurality of zones is configured to effect fluid impingement on a predetermined number of first and second sides of the filter discs of the plurality and wherein no zone is configured to effect fluid impingement on more than about 40% of a total surface area of the filter media of the plurality of filter discs.

4. The precoat removal, regeneration and renewal system of claim 2, wherein each of the plurality of zones is configured to effect fluid impingement on between about 15% and 25% of a total surface area of the filter media on the first and second sides of the plurality of filter discs.

5. The precoat removal, regeneration and renewal system of claim 2, wherein the feed piping and the at least one valve are configured such that the second flow of a relatively higher pressure fluid may be conveyed to the plurality of spray nozzles of a first zone of the plurality of zones while the first flow of a relatively lower pressure fluid may substantially concurrently be conveyed to at least one zone of a remainder of the plurality of zones.

6. The precoat removal, regeneration and renewal system of claim 1, wherein the second flow of a relatively higher pressure fluid may be provided at a sufficient pressure to remove a layer of precoat material in its entirety from the first and second sides of the filter discs, and wherein the first flow of a relatively lower pressure fluid may be provided at a pressure allowing for removal of only an outer portion of the layer of precoat material.

7. The precoat removal, regeneration and renewal system of claim 6, wherein the plurality of spray nozzles is grouped in a plurality of zones.

8. The precoat removal, regeneration and renewal system of claim 7, wherein the feed piping and the at least one valve are configured such that the second flow of a relatively higher pressure fluid may be conveyed to the plurality of spray nozzles of a first zone of the plurality of zones while the first flow of a relatively lower pressure fluid may be substantially concurrently conveyed to at least one zone of a remainder of the plurality of zones.

9. The precoat removal, regeneration and renewal system of claim 7, wherein each disc filter is configured to provide a pressure differential between interiors of the plurality of filter discs and a space exterior to the plurality of filter discs and wherein each zone is configured such that the layer of precoat material may be removed in its entirety from a predetermined percentage of the filter media of the plurality of filter discs without substantially diminishing the pressure differential.

10. The precoat removal, regeneration and renewal system of claim 1, wherein at least a portion of the spray piping is movable and further including a displacement mechanism to move the plurality of spray nozzles and the at least a portion of the spray piping relative to the filter discs.

11. A precoat filter system comprising:
    a plurality of filter discs, each filter disc having a first side and a second side, both sides bearing filter media;
    a plurality of spray nozzles, each first side and each second side of each filter disc of the plurality having at least one spray nozzle positioned to spray a fluid on a surface thereof at a location on a rising side of each filter disc as the plurality of filter discs is rotated about a defined axis;
    spray piping coupled to the spray nozzles of the plurality; and
    at least one valve coupled with feed piping in communication with the spray piping wherein the at least one valve and the feed piping are configured, in combination, to permit selection between a first flow of a relatively lower pressure fluid and a second flow of a relatively higher pressure fluid to be conveyed through the feed piping through the spray piping to the plurality of spray nozzles.

* * * * *